(12) United States Patent
Luu

(10) Patent No.: US 6,991,172 B2
(45) Date of Patent: Jan. 31, 2006

(54) CONTACTLESS TRANSACTION CARD AND ADAPTER THEREFOR

(75) Inventor: Daniel V. H. Luu, Irving, TX (US)

(73) Assignee: Quadnovation, Inc., Irvine, TX (US)

( * ) Notice: Subject to any disclaimer, the term of this patent is extended or adjusted under 35 U.S.C. 154(b) by 100 days.

(21) Appl. No.: 10/443,858

(22) Filed: May 23, 2003

(65) Prior Publication Data

US 2003/0213849 A1   Nov. 20, 2003

Related U.S. Application Data

(63) Continuation-in-part of application No. 10/150,088, filed on May 20, 2002.

(60) Provisional application No. 60/382,344, filed on May 23, 2002.

(51) Int. Cl.
*G06K 19/06*   (2006.01)

(52) U.S. Cl. .................................................. 235/492

(58) Field of Classification Search ................ 235/492, 235/380–381, 486; 455/407, 556, 558, 567, 455/128–129; 343/751, 767
See application file for complete search history.

(56) References Cited

U.S. PATENT DOCUMENTS

| | | | |
|---|---|---|---|
| 5,049,728 A * | 9/1991 | Rovin | 235/492 |
| 5,531,145 A | 7/1996 | Haghiri-Tehrani | |
| 5,563,400 A * | 10/1996 | Le Roux | 235/486 |
| 5,886,333 A * | 3/1999 | Miyake | 235/380 |
| 6,422,473 B1 * | 7/2002 | Ikefuji et al. | 235/492 |

FOREIGN PATENT DOCUMENTS

| | | | |
|---|---|---|---|
| DE | 19646717 A1 * | 5/1998 | |
| DE | 29819389 U1 | 10/1998 | |
| DE | 29819389 U1 * | 1/1999 | |
| DE | 19737565 A1 * | 3/1999 | |
| DE | 19956137 A1 | 11/1999 | |
| DE | 198 26 428 A1 | 12/1999 | |
| DE | 20110585 U1 | 6/2001 | |
| EP | 0495216 A2 | 12/1991 | |
| EP | 0992 366 A1 | 4/2000 | |
| FR | 2627880 A1 * | 9/1989 | |
| FR | 2797075 | 7/1999 | |

* cited by examiner

*Primary Examiner*—Diane I. Lee
(74) *Attorney, Agent, or Firm*—Dickstein Shapiro Morin & Oshinsky LLP

(57) ABSTRACT

A contactless transaction card includes first and second contactless integrated circuit (IC) chips and an antenna connected to both ICs for enabling contactless operation of the functions provided by each IC. The contactless transaction card is preferably fabricated by laminating together a plurality of layers to form a carrier substrate. The antenna and one of the IC chips is embedded within the layers of the carrier substrate so as to be permanently formed in the card, while the second IC chip is provided in the card in a region formed as a micro-sized card which is removable from the main portion of the carrier substrate. Additionally, an adapter card includes a holder for retaining a micro-sized contactless transaction card and contains an antenna arranged to connect with the micro-sized card. The adapter may be used to convert the micro-sized transaction card into a full-sized card and to enable access to the information associated with the IC chip contained in the card.

5 Claims, 9 Drawing Sheets

CONTACTLESS TRANSACTION CARD AND ADAPTER THEREFOR

This application claims priority to U.S. Provisional Application Ser. No. 60/382,344, filed May 23, 2002, and is a continuation-in-part of U.S. application Ser. No. 10/150,088, filed May 20, 2002, the disclosure of which is herein incorporated by reference.

BACKGROUND OF THE INVENTION

1. Field of the Invention

The present invention relates to a versatile contactless electronic transaction card which may provide a plurality of contactless functions on one card. The present invention also relates to a contactless card which may be convertible for use in operating environments having different size accommodations for the contactless card.

2. Brief Description of the Related Art

Electronic transaction cards have long been prevalent in modern society for storing user or account specific information to provide convenient and fast transactions in a variety of situations. For example, such cards may be used to store information regarding a user's account information to facilitate purchase transactions or service transactions, or a user's identity to gain access through secure or privileged networks and systems. Generally, there are two types of such electronic transaction cards—the more established contact-type cards and the more recent contactless transaction cards.

Examples of a contact-type electronic transaction card include the credit card, as shown in FIG. 1, or the subscriber identity modules (SIM) card, as shown in FIG. 2. While credit cards are well known in this country, SIM cards are used primarily in Europe and Asia (although gaining in popularity in the United States) in communication devices such as mobile telephones to enable a user to access an individual account or a particular wireless communication network in a specific country. Generally SIM cards are provided in one of two sizes, i.e., a full-sized card which is sized similarly to a credit card, and a micro or plug-in sized card (see FIG. 2) which is much smaller than a credit card (approximately 25 mm long and 15 mm wide). In the contact-type cards, the account and/or other user-specific information is stored or encoded on a magnetic strip or an integrated circuit (IC) chip embedded in the card. The information stored or associated with the card can only be accessed by placing the magnetic strip or IC chip in direct physical contact with a card reader or access device.

Contactless transaction cards, on the other hand, are presently commonly used in public transportation systems or for security/access control. Similarly to a contact-type card, the integrated circuit in a contactless transaction card may store information specific to a user such as a user's account information or identification information. On the other hand, while a contact-type card requires physical contact of the magnetic strip or IC with the card reader or access device, a contactless transaction card transmits and receives information from and to a card reader or access device via radiofrequency signals and does not require physical contact between the card and the reader or access device.

As shown in FIG. 3, a contactless transaction card 200 includes an integrated circuit 210 mounted on a card substrate 230 and an antenna 220 extending from the IC 210, wherein the antenna 220 is also mounted on card substrate 230. Preferably, both the IC 210 and the antenna 220 are embedded inside a plurality of layers laminated together to form the card 200. The antenna 220 has a relatively long total length with respect to the IC 210, and is typically incorporated in the card 200 in a looped manner or wound in a pattern within the plane of the card. The transfer or reading of information to or from a contactless transaction card is achieved by the transmission of RF signals through the antenna 220 extending from the integrated circuit 210. The length of the antenna is proportional to the transmission and reception range thereof, so that the longer the antenna, the greater the distance away from the reader/access device the card can be held to successfully transfer or access information between the card and the reader/access device.

In an example of using a contactless transaction card, a user is enabled to gain access to a secured location by simply bringing the contactless transaction card close to an access device within a range appropriate for the antenna, whereupon the access device is enabled to read the identification data contained in the IC via the antenna in the card. If the access device determines that the user, based on the detected identification information, is authorized to access the secured location, the access device sends a signal which controls the security system to enable the user to gain access to the secured location.

When a contactless transaction card is used in a transportation system, for example, the IC mounted in the card contains the user's account information, such as an available balance (for a declining balance type of arrangement), or billing information (for a credit type of arrangement). The manner of operation for using the card to enter or exit the transportation system or to access or update the user's account is similar to the operation for access control, in that the card is simply brought towards the card reader within the transmission range of the antenna.

Contactless transaction cards provide several advantages over the standard integrated circuit (contact-type) cards, such as faster transaction times, greater ease of use, and less wear and tear on the cards and the access devices. Hence, the popularity of contactless transaction cards is increasing as wireless technology becomes incorporated into a greater variety of applications.

One consequence of the increased use of contactless transaction cards is that a user may be required to carry several cards at one time, each card usable in a different environment and/or for different functions. It would thus be desirable to consolidate and/or provide versatility to a contactless transaction card to reduce the number of cards maintained by a user.

SUMMARY OF THE INVENTION

The present invention includes a contactless transaction card which includes first and second contactless integrated circuit (IC) chips and an antenna connected to both ICs for enabling contactless operation of the functions provided by each IC. The contactless transaction card is preferably fabricated by laminating together a plurality of layers to form a carrier substrate. The antenna and one of the IC chips is embedded within the layers of the carrier substrate so as to be permanently formed in the card, while the second IC chip is provided in the card in a region formed as a micro-sized card which is removable from the main portion of the carrier substrate.

The present invention also includes an adapter card having a holder for retaining a micro-sized contactless transaction card and containing an antenna arranged to connect with the micro-sized card. The adapter thus converts the micro-sized transaction card into a full-sized card and enables access to the information associated with the IC chip contained in the card.

Other features and advantages of the present invention will become apparent from the following description of the invention which refers to the accompanying drawings.

DETAILED DESCRIPTION OF THE INVENTION

Figure 1:
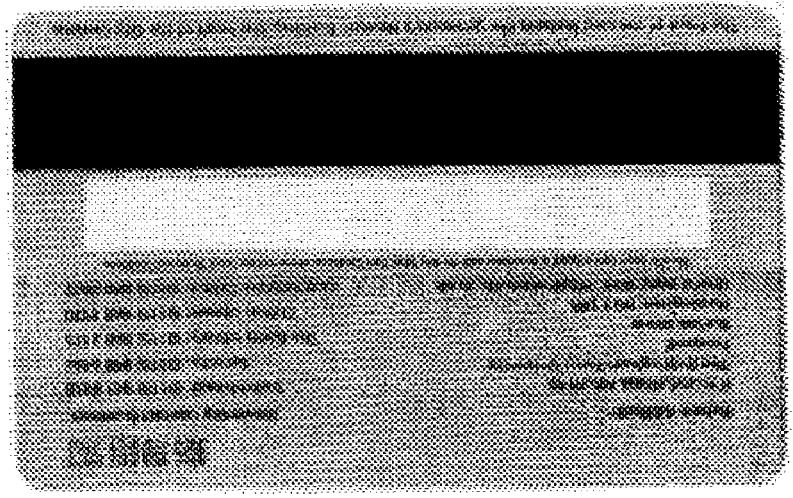
FIG. 1 shows a standard credit card corresponding to a first embodiment of a contact-type electronic transaction card as known in the art.
Figure 2:
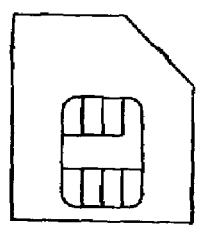
FIG. 2 shows a micro-sized SIM card corresponding to a second embodiment of a contact-type electronic transaction card as known in the art.
Figure 3:
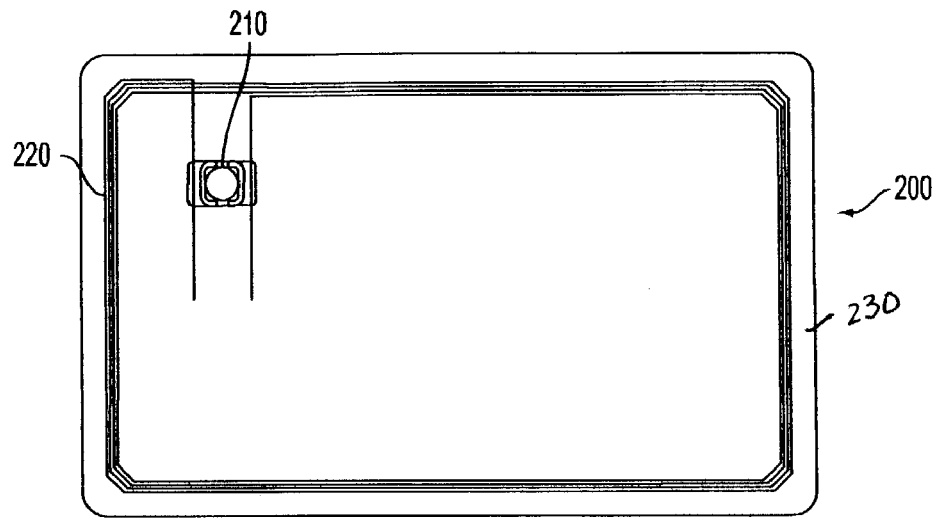
FIG. 3 shows a standard contactless transaction card as known in the art.
Figure 4:
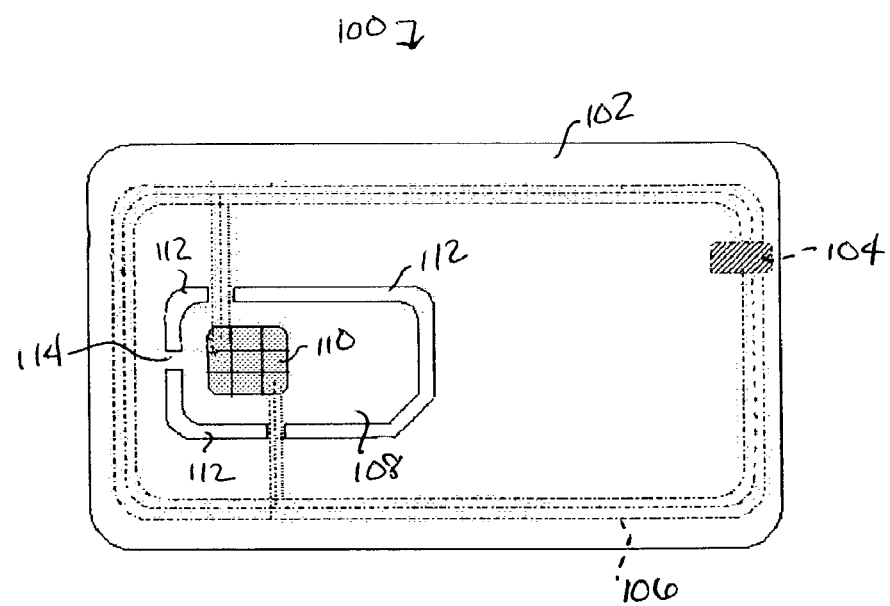
FIG. 4 illustrates a contactless transaction card in accordance with the present invention.

A full-sized contactless transaction card 100 according to the present invention is shown in FIG. 4 and includes a card substrate 102 having a first contactless integrated circuit (IC) chip 104 and an antenna 106 embedded therein, and a micro-sized card 108 formed in the substrate 102 with a second contactless IC chip 110 mounted in the micro-sized card 108. As indicated in FIG. 4, the first IC chip 104 and the antenna 106 are formed beneath the exterior surface of card substrate 102. IC chip 108, on the other hand, is accessible at the surface of micro-sized card 108.

The micro-sized card 108 is formed in the card substrate 102 so as to be detachable therefrom. For example, a plurality of cuts 112 may be made through the thickness of the card substrate 102 to define the shape of the micro sized card 108, leaving one or more uncut connection bridges 114 between the body of the micro-sized card 108 and the card substrate 102. Alternatively, instead of forming cuts 112 around substantially the entire perimeter of the micro-sized card 108, one or more sides of the micro-sized card may be detachably connected to the card substrate by a perforation through the card substrate (see FIGS. 5A–5C).

Figure 5A:
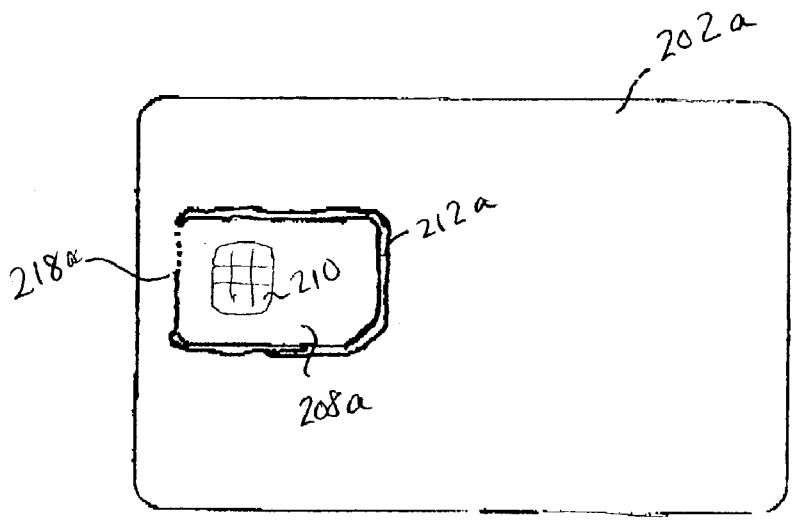
FIGS. 5A–5C illustrate the layers forming the contactless transaction card shown in FIG. 4.
Figure 5B:
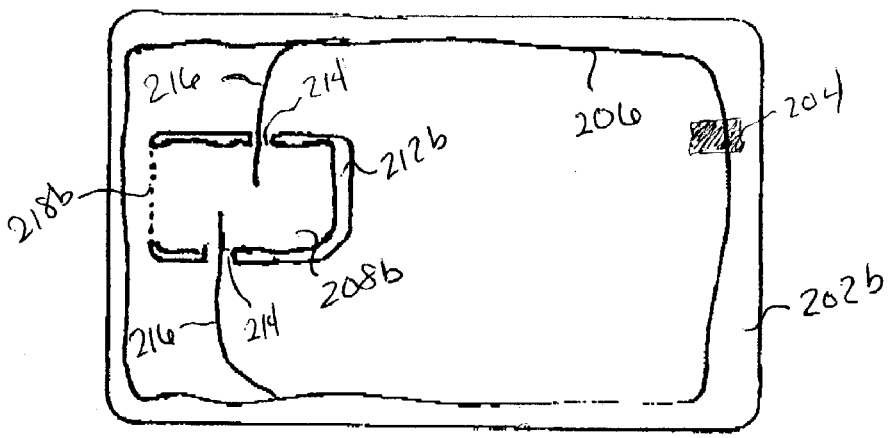
Figure 5C:
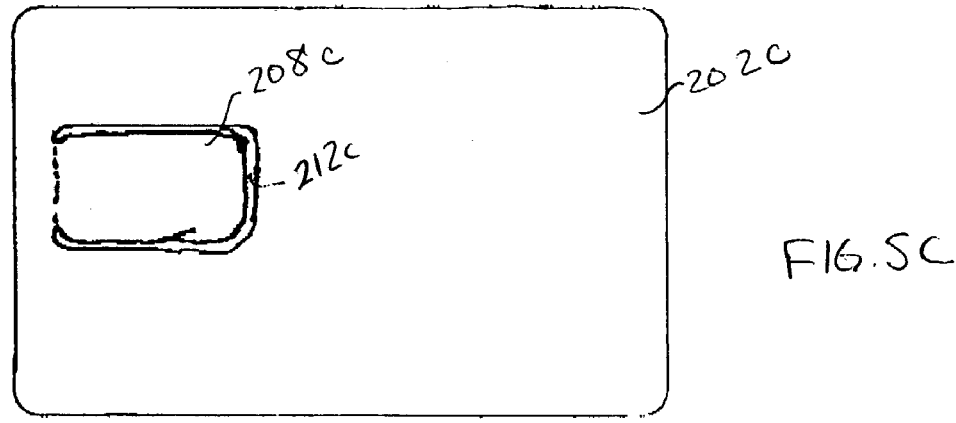

Referring now to FIGS. 5A–5C, the card substrate is preferably formed as a laminate of at least three layers 202a, 202b, 202c of a plastic or polymeric material, such as PVC. Top layer 202a is shown in FIG. 5A and has a cut 212a formed therethrough defining a substantial portion of the periphery of a micro-sized card 208a. As shown in FIG. 5A, top layer 202a does not include bridges between the body of micro-sized card 208a and the main portion of top layer 202a. In the example embodiment shown in FIG. 5A, however, one side of the micro-sized card 208a is connected to the main portion of layer 202a along a perforated line 218a. IC chip 210 is provided in layer 202a so that at least electrical contacts of the IC 210 are exposed at both the front and rear surfaces of layer 202a.

The middle layer 202b is shown in FIG. 5B and includes a micro-sized card 208b defined therein by cuts 212b. Similarly to layer 202a, one side of micro-sized card 208b is connected to the main portion of layer 202b along a perforated line 218b. Unlike layer 202a, however, the cuts 212b in layer 202b are interrupted along the perimeter of the shape of micro-sized card 208b to define bridges 214 between the body of micro-sized card 208b and the main portion of layer 202b.

Middle layer 202b further includes an IC chip 204 mounted therein and an antenna 206 formed thereon. Antenna 206 typically (although not necessarily) has a total length several times the perimeter of card layer 202b, and is therefore coiled or looped around the planar area of the layer 202b. As antenna 206 is coiled around layer 202b, it runs across and contacts IC chip 204 so as to enable information to be stored and accessed in IC chip 204 via RF transmission through the antenna 206. Antenna 206 also includes end segments 216 extending from the coiled portion, over the bridges 214 and into the body of micro-sized card 208b. Preferably, the bridges 214 are located along the peripheral shape of micro-sized card 208b so that the end segments 216 of antenna 206 extend into the body of the micro-sized card 208b at positions aligned with the appropriate contact points of IC chip 210. Since the layers 202a, 202b 202c will be stacked and laminated together, as described further below, the appropriate contact points of IC chip 210 contact the antenna end segments 216 at the rear surface of layer 202a when the layers are assembled into the finished card as illustrated in FIG. 4.

For each contactless chip, the antenna loop(s) are connected to the chip at a positive region thereof and also at a negative region of the chip, so that the electromagnetic signals flow in to the respective chip at one side thereof, and out from the chip at another side thereof The middle portion of each chip is ground.

Antenna 206 may be formed on the layer 202b in several ways. For example, antenna 206 can be simply provided as a length of a filament or wire affixed to the surface of layer 202b. Alternatively, antenna 206 may be formed as a continuous line of a conductive ink, which may be deposited on the layer 202b by printing.

As shown in FIG. 5C, bottom layer 202c of the card substrate is formed similarly to top layer 202a shown in FIG. 5A, except that the cut-out shape of micro-sized card 208c does not include a mounted IC chip. In particular, the cut 212c substantially defining the periphery of micro-sized card 208c does not include bridges. Thus, only the middle layer 202b includes bridges 214 between the micro-sized card 208b and the main portion of the card layer 202b.

After forming the layers 202a, 202b and 202c as described above, the layers are aligned over each other and laminated together to form the contactless transaction card as shown in FIG. 4, with antenna 206 and IC chip 204 permanently integrated within the card substrate. In the final form of the contactless transaction card, the antenna 206 is in permanent contact with the contactless IC chip 204 to enable contactless operation of the function provided therein, similarly to a standard full-sized contactless card. Additionally, operation of another contactless function is enabled via the contactless IC chip 210 by the antenna ends 216 extending between or within the layers forming the micro-sized card to connect with the contactless IC chip 210 while the micro-sized card is retained as part of the full-sized card. Thus, the two contactless chips 204 and 210 share the antenna 206 for transmitting and receiving information to and from the respective IC chips, resulting in one contactless card being usable for more than one type of contactless transaction.

Preferably, the micro-sized card is connected to the main portion of the card along only one perforated edge formed through all of the layers 202a, 202b, 202c, and only the middle layer 202b includes the bridges 214 to provide a surface for the antenna to be connected to the IC chip 210 of the micro-sized card. The ease with which the micro-sized card can be detached from the larger contactless card is maximized by providing the perforated edge between the micro-sized card and the main portion of the card substrate and by reducing the thickness of the bridges by forming the bridges in only one of the plurality of layers of the card.

Although the construction of the contactless card has been described above with respect to a specific embodiment, in practice the invention encompasses alternative embodiments, including contactless cards having more than two IC chips embedded, contactless cards formed having more layers than that shown and discussed with reference to FIGS. 5A–5C, inter alia.

Figure 6:
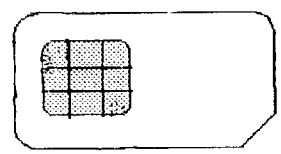
FIG. 6 shows the micro-sized contactless transaction card of the present invention upon being separated from the card shown in FIG. 4.
Figure 7:
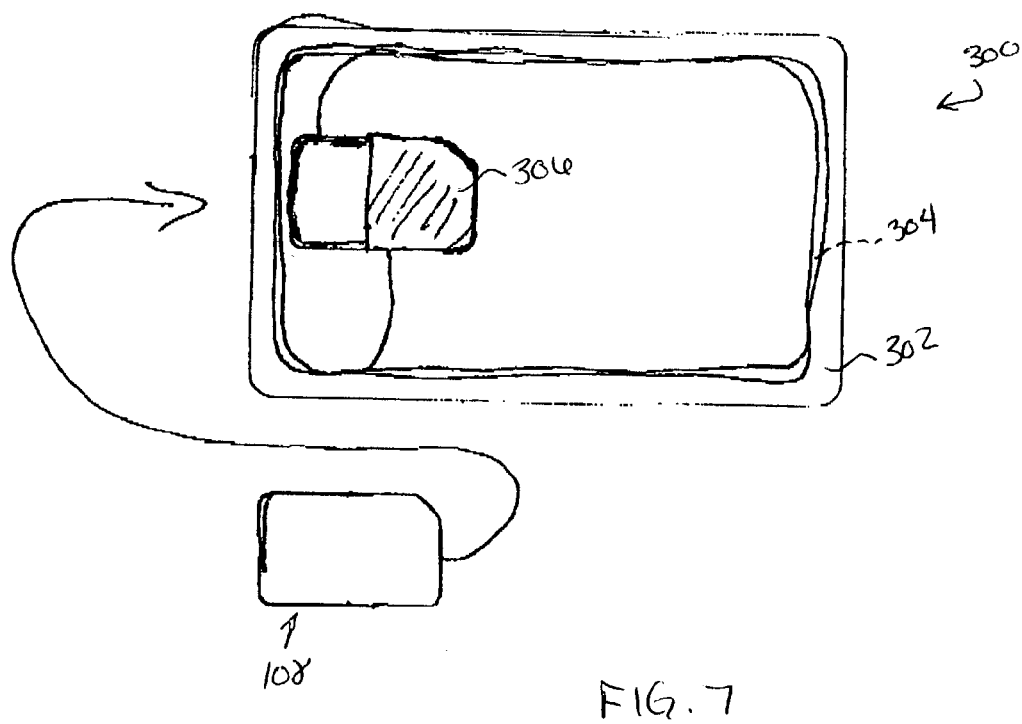
FIG. 7 illustrates an adapter usable in connection with the micro-sized card shown in FIG. 6 in accordance with the present invention.

Upon removing the micro sized card 108 from the card substrate 102, as seen in FIG. 6, the micro sized card must then be connected with another antenna to restore contactless operation of the contactless chip 110. For example, the micro sized card 108 may be inserted into an adapter card 300, such as that shown in FIG. 7, which includes a substrate 302, an embedded antenna 304, and a pocket 306 for holding a micro-sized card 108.

Like the carrier substrate shown in FIGS. 5A–5C, the adapter card 300 may be formed of a plurality of layers laminated together. Preferably, the layers are each made of a plastic or polymeric film, although it is not necessary that each layer be made of the same material.

Figure 8A:
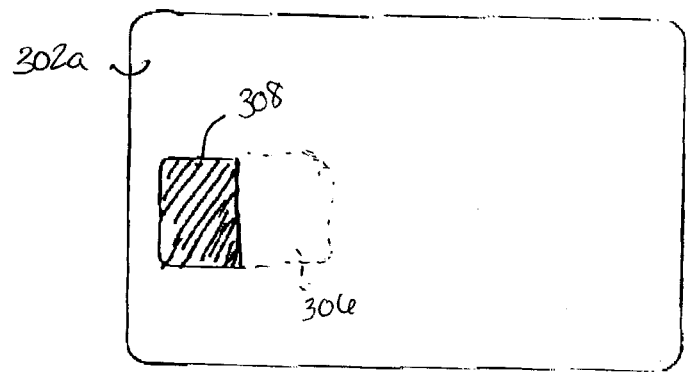
FIGS. 8A–8D illustrate the layers forming the adapter shown in FIG. 7.

As shown in FIG. 8A, the top layer 302a is formed with a cutout region 308 sized and shaped corresponding to about half the micro-sized card 108. Layer 302a preferably has a thickness which is sufficiently pliable to enable a micro-sized card to be slipped through the cutout region 308 and underneath the pocket 306.

Figure 8B:
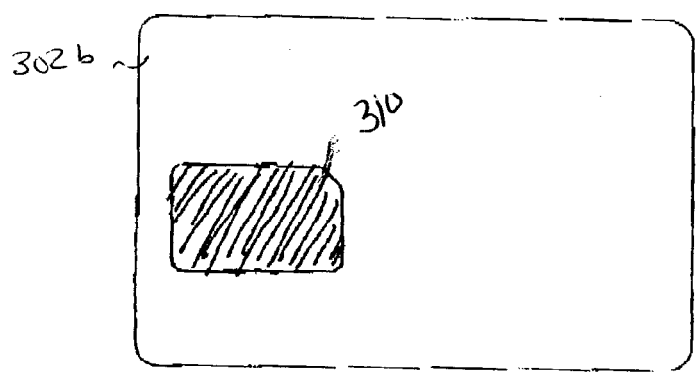

The second layer 302b is shown in FIG. 8B and includes a cutout 310 the size and shape of the micro-sized card 108. Preferably, the second layer 302b has a thickness greater than that of the top layer 302a and is approximately equal to or slightly less than the thickness of the micro-sized card 108.

Figure 8C:
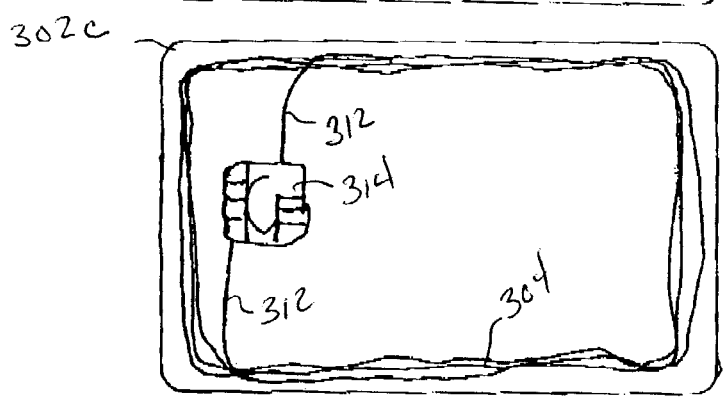
Figure 8D:
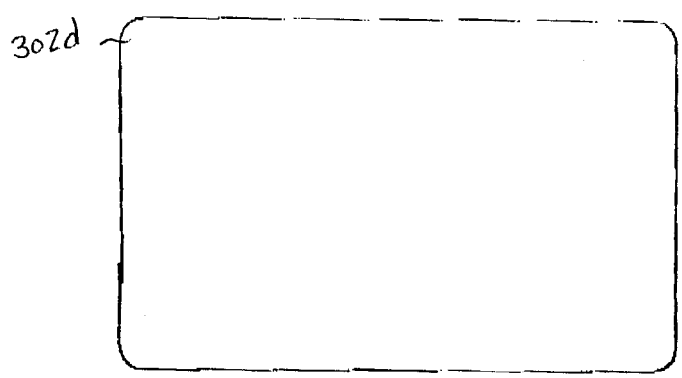

A third layer 302c as shown in FIG. 8C includes an antenna 304 formed thereon in a manner similar to that provided on middle layer 202b of the contactless card as shown in FIG. 5B. End segments 312 of the antenna 304 extend into an alignment indicator 314 formed on the surface of layer 302c, so that upon assembly of the layers, the antenna ends 312 are affixed to the layer 302c in the alignment indicator 314 region at a location corresponding to where the IC chip of contactless card 108 is positioned when the card is properly inserted into the adapter.

Alternatively, the antenna may be formed between the top layer 302a and the second layer 302b, with the end segments 312 affixed to the third layer 302c in the region of the indicator 314 upon assembly of the adapter. Optionally, a fourth layer 302d may be provided as the bottom layer of the adapter 300. The bottom layer is solid, with no shapes, holes or cutouts formed therein. Other alternatives are also envisioned within the scope of the present invention, including adapter cards formed with additional or different layers, and carrier cards with different structures for forming the contactless card holder.

To use the adapter 300, the micro-sized card 108 is inserted into the pocket 306 with the contactless IC chip 110 facing the alignment indicator 314. This places the IC chip 110 into electrical contact with the antenna end segments 312 and enables contactless operation of the function provided by the chip.

Alternatively, the micro-sized card 108 may be operatively stored in a carrier provided on the housing of a mobile telephone. Since many people today typically keep their mobile telephones close at hand and readily accessible, it would be very convenient for them to keep the micro-sized contactless card within the housing of a mobile telephone. With this arrangement, a user only needs to wave the mobile telephone in front of the reader when necessary to use the contactless card, rather than having to rummage for the contactless transaction module in his or her wallet, purse or bag.

Figure 9:
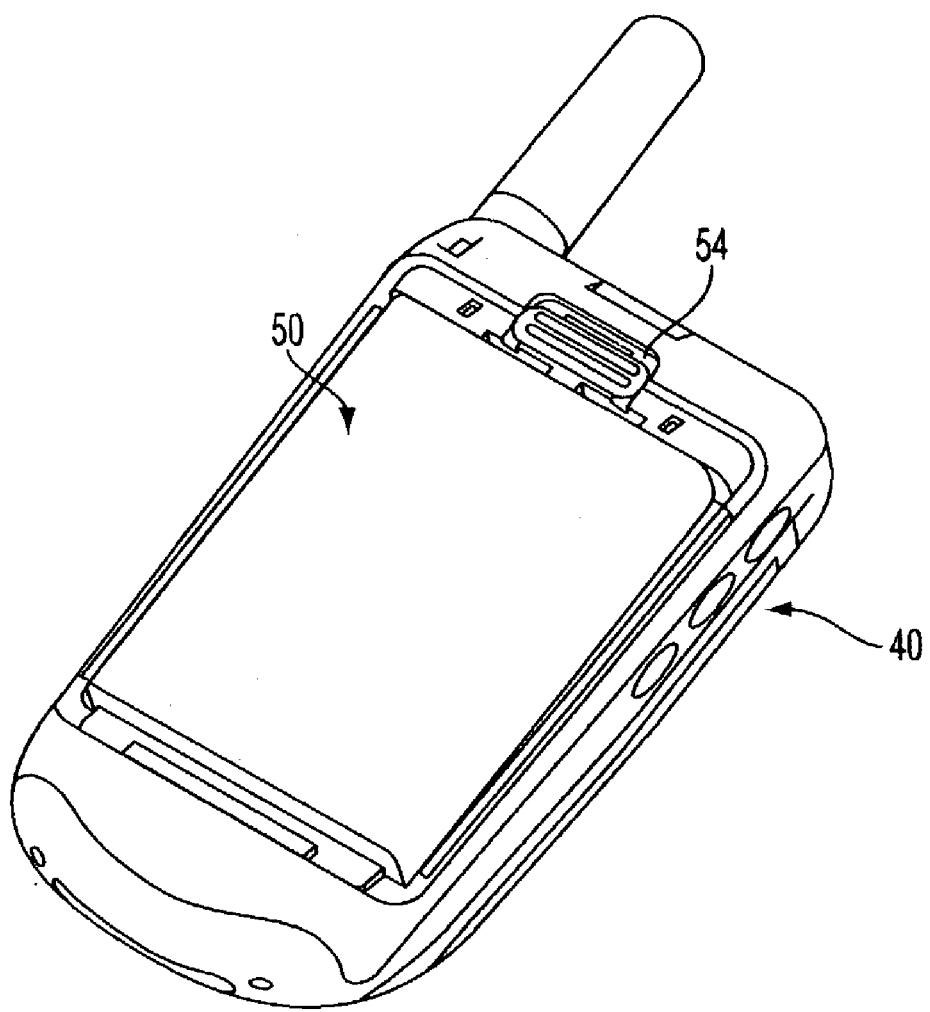
FIG. 9 illustrates an alternative embodiment of a carrier for a micro-sized contactless card, formed as a cover for a mobile communication device.
Figure 10:
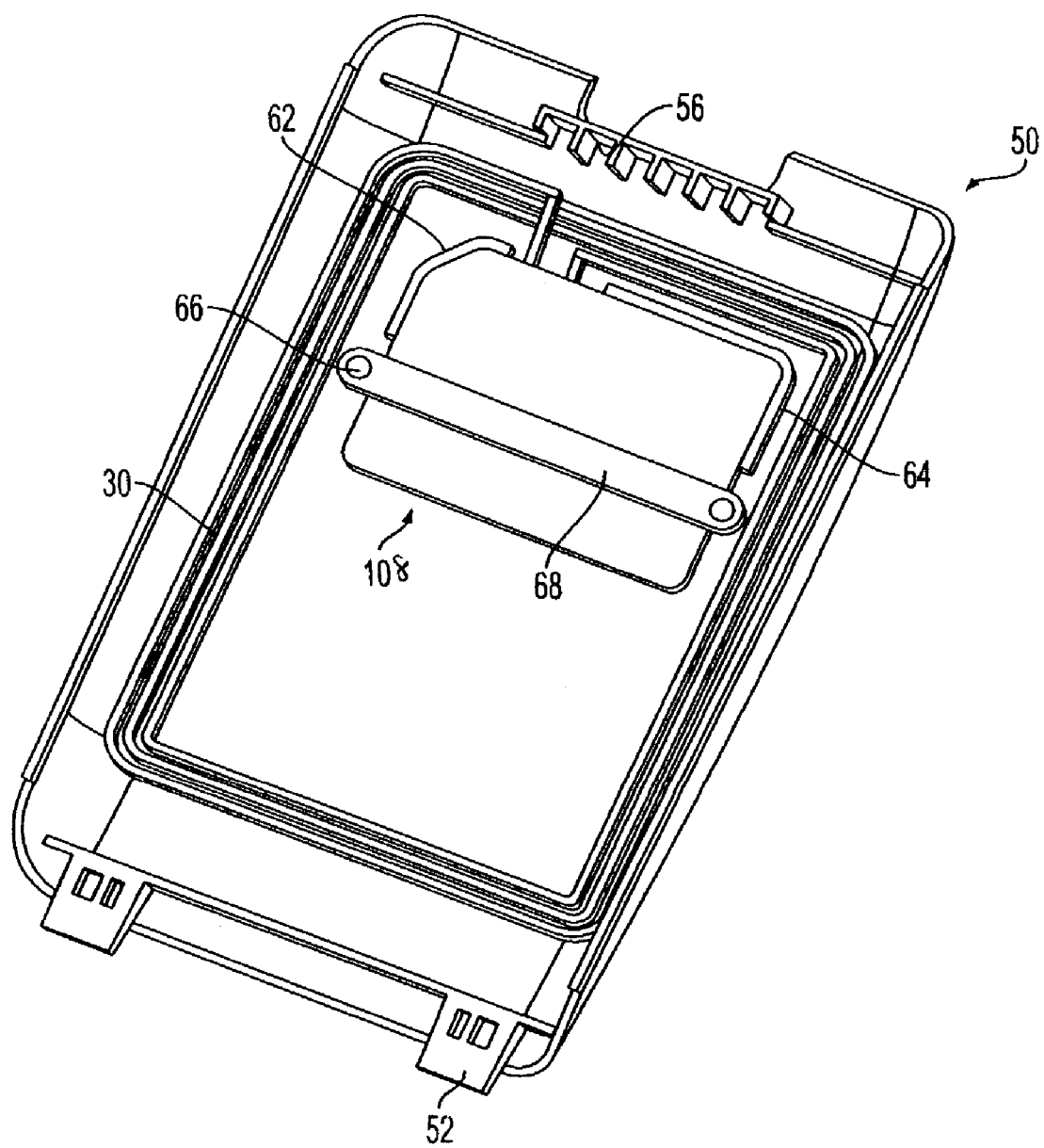
FIG. 10 illustrates a first holder arrangement for the carrier shown in FIG. 9.
Figure 11:
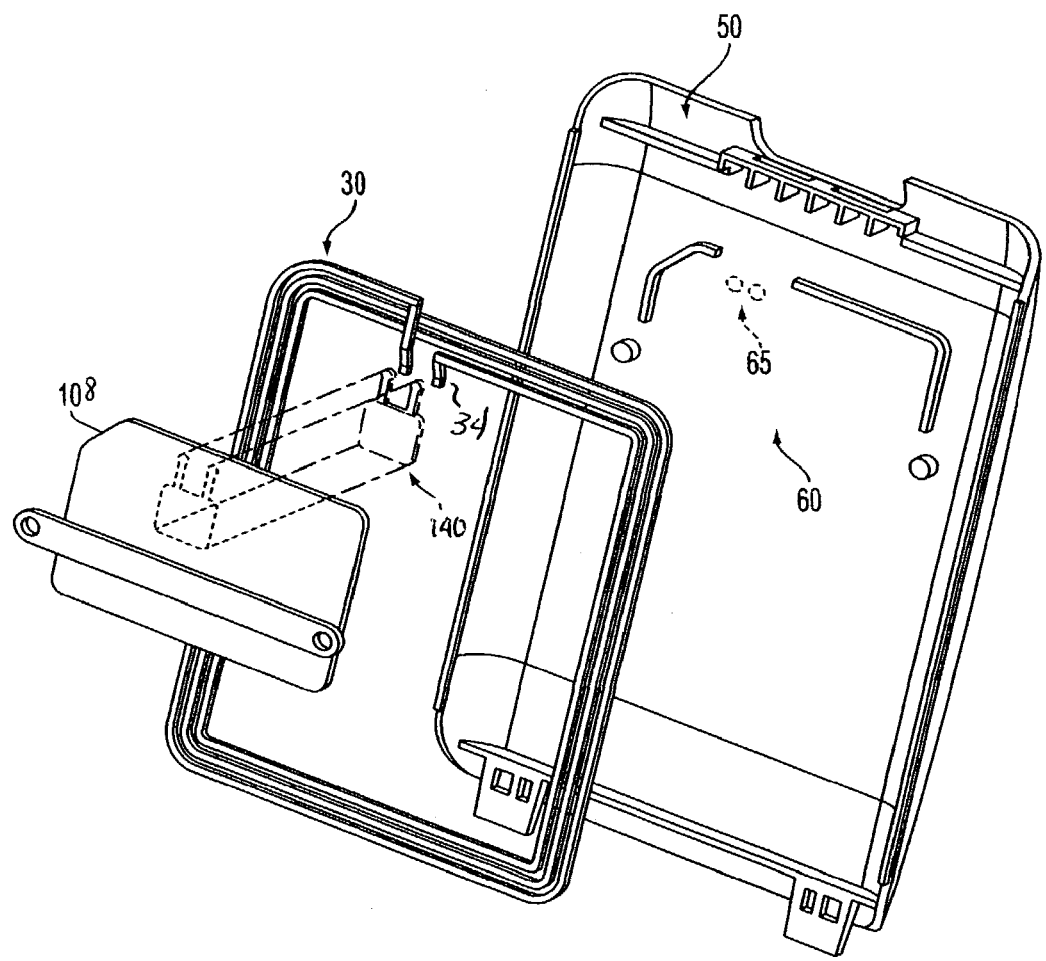
FIG. 11 is an exploded view of the carrier arrangement shown in FIG. 10.
Figure 12:
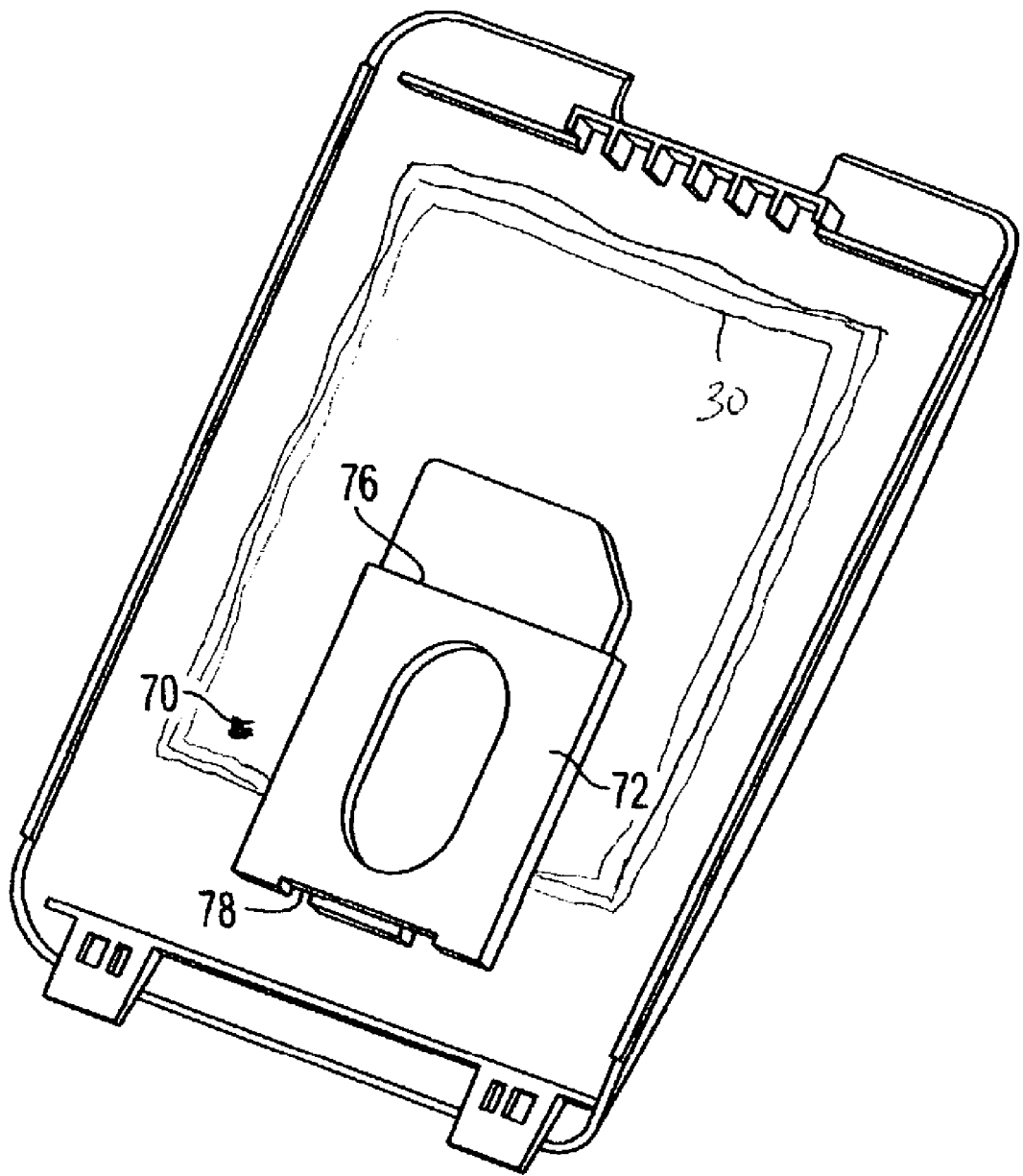
FIG. 12 illustrates an alternative holder arrangement for the carrier shown in FIG. 9.

FIG. 9 shows a cover 50 in accordance with the present invention attached to a mobile telephone 40. Cover 50 defines an interior space having a thickness at least sufficient to accommodate the thickness of a contactless transaction card 108 and a holder 60 (FIG. 11) into which the contactless transaction module is inserted. As can be seen in FIGS. 10–12, cover 50 includes stationary tabs 52 formed along the bottom edge thereof for engaging with corresponding slots formed in the housing of mobile telephone 40.

As seen in FIG. 9, cover 50 is shown to be attachable to the mobile phone along the top edge of cover 50 by a latch mechanism controlled by resilient pushtab 54. For example, an upwardly-facing hook-type latch may be formed at the base of pushtab 54, wherein the latch catches under a ledge 56 formed along the inner surface at the top edge of cover 50 when the cover is attached to mobile phone 40. Alternatively, pushtab 54 and the corresponding latch may be formed on the top edge of cover 50, to catch a corresponding ledge formed on the housing of mobile phone 40.

Cover 50 can be attached to mobile phone 40 by inserting tabs 52 into the corresponding slots formed in the housing of mobile phone 40, and pressing the top edge of cover 50 against mobile phone 40 until the latch on tab 54 catches under ledge 56 on cover 50 or on the housing of mobile phone 40, depending on the configuration of the cover and phone.

Cover 50 can be detached from mobile phone 40 by pressing on pushtab 54 to release the latch from the ledge on cover 50 or on the telephone housing, whereby cover 50 can be lifted off the surface of mobile phone 40 so as to disengage tabs 52 from their respective slots in the phone housing.

The resiliency of pushtab 54 may be provided by a spring which secures the pushtab to the mobile phone housing or to cover 50, or may be provided simply by the naturally deformable characteristic of a plastic material from which the tab is formed.

Of course, cover 50 can be adapted in shape and dimensions to accommodate different styles of mobile telephones. Moreover, depending on the handset style of the mobile telephone, particularly those in which a detachable battery unit forms the back cover of the phone housing, cover 50 may be constructed as an additional cover over the battery unit. In this variation, cover 50 may optionally be formed with inwardly-facing detents or other protruding elements along the side edges of cover 50, for engaging corresponding grooves or slots formed on the battery unit or phone housing. Cover 50 may then be slid on and along the battery unit to engage and disengage cover 50 into position on the phone and to remove the same.

A first embodiment of such a cover 50 is shown in FIGS. 10 and 11. In this embodiment, ridges 62 and 64 are formed on the interior surface of cover 50 which correspond in shape to the micro-sized card 108. Ridges 62, 64 may have a height as great as the thickness of card 108, but may be lower. Ridges 62 and 64 serve as positioning guides to maintain the position of a contactless micro-sized card 108 inserted into holder 60.

A retaining strip 68 is affixed to the interior surface of cover 50 by posts 66 and spans from the vicinity of the end of ridge 62 to the vicinity of the end of ridge 64, across the space substantially encompassed between ridges 62 and 64. The length of retaining strip 68 is at least equal to the corresponding length or width dimension of card 108. The surface of retaining strip 68 facing the interior surface of cover 50 is preferably situated at a height which is very slightly less than the thickness of card 108, to provide tension against card 108 when inserted into holder 60, but not at a height so low as to prevent insertion of card 108 into holder 60. Retaining strip 68 serves to securely hold card 108 in place against ridges 62 and 64 when the card is inserted into holder 60.

Ridges 62 and 64, posts 66, and retaining strip 68 are preferably constructed of the same materials used to form the interior surface of cover 50. Alternatively, retaining strip 68 may be made of a material having elasticity to enhance its retaining function.

Cover 50 may be provided with an antenna 30 already "built-in" on the surface of the cover 50, with antenna ends 34 being provided at a location such that they would naturally line up with the IC 110 on the contactless card 108 when subsequently inserted into holder 60. The antenna ends 34 may be provided either on the interior surface of cover 50 or on the surface of the retaining strip 68 which faces an inserted card 108.

In the case in which the micro-sized card 108 is sized and shaped like a plug-in sized SIM card, the card 108 is inserted into holder 60 at an orientation such that the angled corner 14 is aligned with the position of ridge 62, and then sliding the card 108 under retaining strip 68 until the inserted corners of the module abut ridges 62 and 64, as shown in FIG. 10. Of course, the orientation of holder 60 can be varied so that the angled corner of the inserted card 108 is positioned to the upper right side of the cover as opposed to the upper left side as illustrated in FIGS. 10 and 11, or so that the angled corner is positioned at the lower left or lower right corner of the holder, wherein the card 108 is inserted from above the retaining strip 68 as seen in the drawings. Alternatively, ridge 64 can be designed to conform to the corner adjacent the angled corner of a micro-sized card 108 in the short dimension as opposed to the long dimension. Similarly, ridge 62 can be positioned to orient the angled corner marking at the upper left, upper right, lower left, or lower right corner of holder 60.

Of course, if the size and shape of micro-sized card 108 is formed to be different from that of a plug-in sized SIM card and as illustrated in the drawings, holder 60 in cover 50, specifically ridges 62 and 64, should be correspondingly shaped to conform to the size and shape of the card 108.

In view of the various possible orientations and configurations of micro-sized card 108 in holder 60, ridges 62 and 64 should be configured so that when a micro-sized card 108 is inserted in holder 60, IC 110 on micro-sized card 108 will be placed in the appropriate position facing the interior surface of cover 50 to become aligned with the ends 34 of antenna 30 provided on the surface of cover 50, as seen in FIG. 11.

Another embodiment of a carrier for a micro-sized contactless transaction card is shown in FIG. 12. In this embodiment, a holder for a contactless transaction card is formed as a pocket 70 on the interior surface of cover 50. Pocket 70 is formed by an envelope 72 securely attached to the interior surface of cover 50, and is sealed or has a barrier along three of the four sides to prevent a contactless transaction card inserted therein from sliding out. The width of envelope 72 is sized to snugly accommodate the contactless transaction card therein, and the height thereof is preferably less than that of the card.

Envelope 72 also includes a window 74 large enough to enable the user to push an inserted module out of pocket 70 with his or her finger. Pocket 70 is positioned on the interior surface of cover 50 with its bottom end 78 close to one edge of cover 50 and pocket opening 76 positioned more towards the center of cover 50, relative to bottom end 78. To insert the card, the module is laid against the interior surface of the cover 50 above the pocket opening 76 and slid into pocket 70.

Similarly to the carrier embodiment shown in FIGS. 10 and 11, the antenna is permanently affixed on the surface of the cover, with the ends of the antenna located at the appropriate location to be aligned with the IC when the contactless transaction card is inserted into pocket 70. Here, it is important that the contactless transaction card be inserted so that the side containing the IC is facing the surface of cover 50, so that the IC lines up with the ends of the antenna provided on the cover.

Carriers for the contactless transaction modules according to the present invention may be embodied in alternative forms other than as the adapter 300 or a cover for a mobile telephone as disclosed above. For example, such carriers may be formed as a cover or an accessory for a laptop or notebook computer, a palmtop or handheld organizer or computing device such as a personal digital assistant, or any other type of portable electronic and/or communication device. Such carriers may be embodied in any form which may be convenient to a mobile user, so long as the carrier includes a holder for a contactless transaction module and an antenna provided in or on the carrier at a location so as to be aligned with a contactless transaction card when the card is inserted into the holder.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A contactless transaction card comprising:
   a substrate dimensioned according to a standard-sized transaction card;
   an antenna provided in the substrate;
   a first integrated circuit chip mounted in the substrate and operatively connected to the antenna for enabling operation of a first contactless transaction function;

a micro-sized card defined in a portion of the substrate so as to be detachable from the substrate; and a second integrated circuit chip mounted in the substrate within the portion of the substrate defined as the micro-sized card and operatively connected to the antenna for enabling operation of a second contactless transaction function.

2. The contactless transaction card according to claim 1, wherein the micro-sized card is detachably defined in the substrate by at least one cut through the thickness of the substrate, the cut being substantially shaped according to the periphery of the micro-sized card.

3. The contactless transaction card according to claim 2, further comprising at least one uncut connection bridge connecting the micro-sized card with a remainder portion of the substrate, wherein the antenna connects to the second integrated circuit chip card by extending across the at least one connection bridge.

4. The contactless transaction card according to claim 1, wherein the micro-sized card is connected to a remainder portion of the substrate along a perforated line.

5. A method of forming a contactless transaction card, comprising:

providing at least first, second and third layers of a material, wherein the first, second and third layers each have a shape and a size substantially corresponding to a full-sized transaction card;

defining a shape corresponding to a micro-sized card in the first layer of material by forming a continuous cut through the first layer along a substantial portion of a periphery of the micro-sized card;

mounting a first integrated circuit chip within the shape corresponding to the micro-sized card of the first layer;

defining the shape corresponding to the micro-sized card in the second layer of material by forming a plurality of cuts through the second layer along the periphery of the micro-sized card, wherein the plurality of cuts leaves at least one bridge between the micro-sized card and a remainder portion of the second layer;

mounting a second integrated circuit chip on the second layer;

providing an antenna on the second layer in electrical connection with the first and second integrated circuit chips, the antenna connecting to the first integrated circuit chip by extending into the micro-sized card portion via the at least one bridge;

defining a shape corresponding to a micro-sized card in the third layer of material by forming a continuous cut through the third layer along a substantial portion of a periphery of the micro-sized card; and laminating the at least first, second and third layers together.

* * * * *